United States Patent [19]

Anderson et al.

[11] 4,126,933
[45] Nov. 28, 1978

[54] METHOD FOR ASSEMBLING A PERMANENT MAGNET ROTOR

[75] Inventors: Gordon K. Anderson, Tustin; Orvin E. Ball, Temple City, both of Calif.

[73] Assignee: Carrier Corporation, Syracuse, N.Y.

[21] Appl. No.: 815,631

[22] Filed: Jul. 14, 1977

[51] Int. Cl.² ............................................. H02K 15/02
[52] U.S. Cl. ........................................ 29/598; 29/732; 310/42; 310/43; 310/156
[58] Field of Search ................... 29/598, 732, 736; 310/156, 42, 43

[56] References Cited

U.S. PATENT DOCUMENTS

| | | | |
|---|---|---|---|
| 2,485,474 | 10/1949 | Brainard | 310/156 |
| 2,660,865 | 12/1953 | Durant | 62/117.1 |
| 2,680,822 | 6/1954 | Brainard | 29/598 X |
| 3,629,925 | 12/1971 | Brown, Jr. et al. | 29/736 |
| 3,828,212 | 6/1974 | Harkness et al. | 310/156 X |

*Primary Examiner*—Carl E. Hall
*Attorney, Agent, or Firm*—J. Raymond Curtin; Robert P. Hayter

[57] ABSTRACT

A method for assembling a permanent magnet rotor by mounting the magnets and the appropriate electrical steel laminations between two retaining discs. The laminations and magnets are then forced into position by a pneumatic expansion tool. The retaining discs after the components are positioned are riveted to secure the laminations and the magnets which are further encapsulated in the retaining discs with an epoxy resin.

7 Claims, 4 Drawing Figures

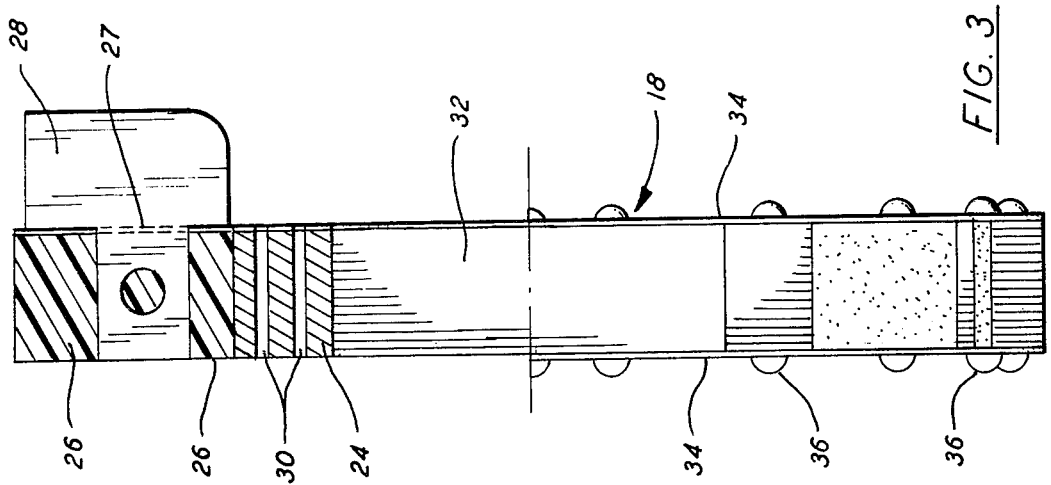
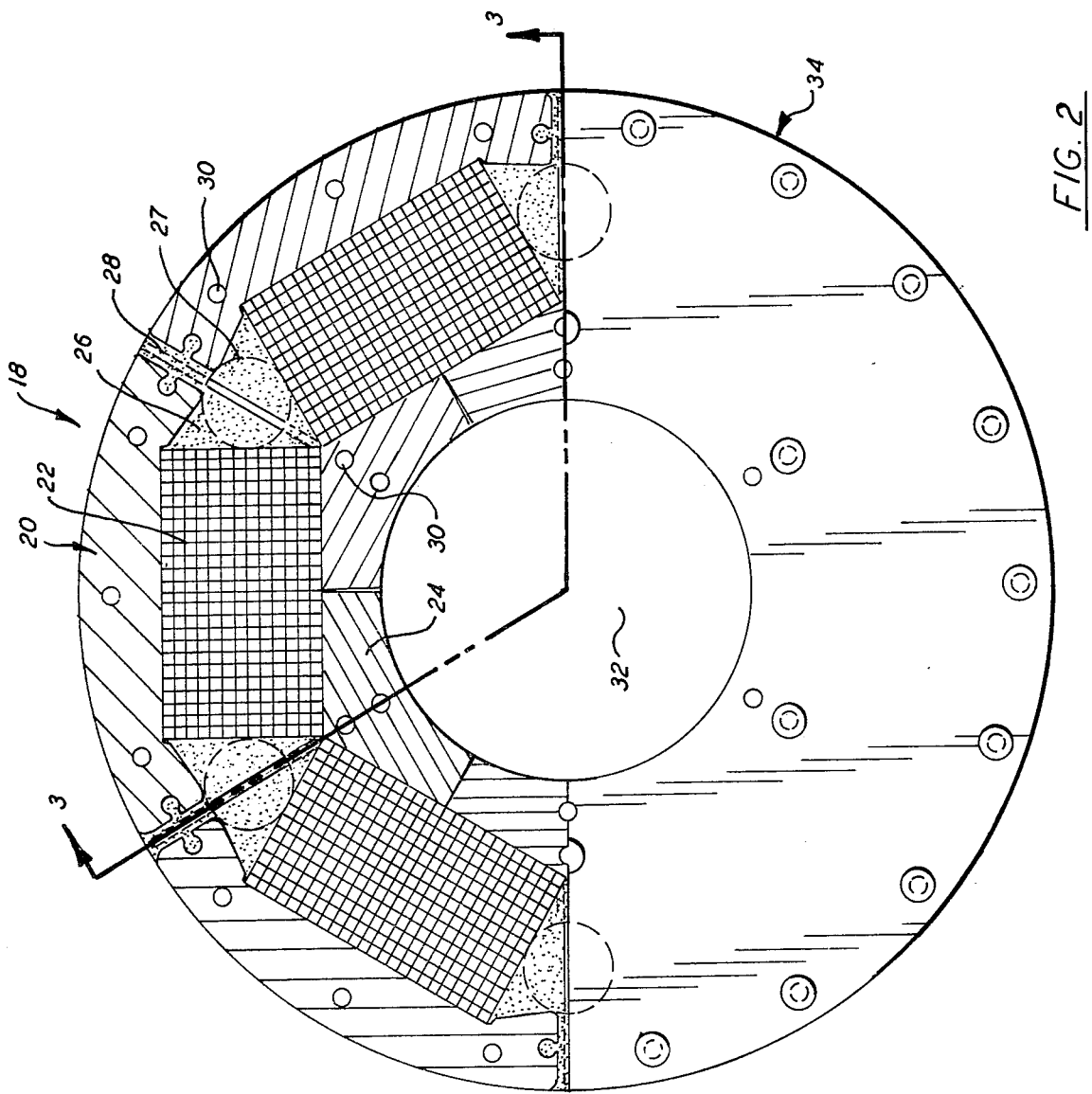

1

METHOD FOR ASSEMBLING A PERMANENT MAGNET ROTOR

BACKGROUND OF THE INVENTION

1. Field of the Invention

The present invention relates to a method of forming rotors for use in an electricity generator. More specifically, the present invention relates to a method for assembling rotors having permanent magnets mounted therein for use with an electricity generator having a fixed stator.

2. Description of the prior art

Transportable refrigeration units have long used rotors having permanent magnets as part of a generator within the refrigeration unit. The typical refrigeration unit of this nature must be adopted to be driven by a prime mover while the unit is being transported between several locations. The unit has a generator to provide electricity to power the various components within the unit. Typically the prime mover driving the rotor is also connected to the compressor of the vapor compression refrigeration system.

It has been found that a generator of the permanent magnet type operates to deliver a supply of current suitable for operating fan or blower motors without the use of brushes or other rotating electrical connections. Permanent magnet rotors have been assembled using a centrifugal casting method. This method includes stacking the magnets and the various laminations between two retaining discs and then riveting the top and bottom retaining discs loosely in place. The entire assembly is then rotated so that the magents and laminations are forced radially outward against each other. This rotation of the assembly is within a rotating mold and molten aluminum is cast within the mold during the rotation. This requires the pouring of molten aluminum from an open ladle into the mold and further requires that the internal components of the assembly be heated to approximately 1000° F. during casting (See U.S. Pat. No. 2,485,474). It has been found that manufacturing quality is difficult to control using this method and that the number of rejects for failing to comply with the appropriate quality control standards is excessive.

U.S. Pat. No. 2,660,865 issued to Wilbur G. Durant and assigned to Transicold Corporation, now a division of the assignee corporation herein, shows the use of a permanent magnet rotor within an electrical generator of a transportable refrigeration unit.

SUMMARY OF THE INVENTION

An object of the present invention is to manufacture permanent magnet rotor assemblies for use with an electrical generator.

A more specific object of the present invention is to manufacture permanent magnet rotor assemblies for use in an electrical generator without using a centrifugal casting process.

A still further object of the present invention is to pneumatically force the various components of a permanent magnet rotor into position so that they may be secured without utilizing a centrifugal casting process.

Another object of the present invention is to provide a manufacturing method for a permanent magnet rotor that does not involve the casting of a metal.

A still further object of the present invention is to provide a permanent magnet rotor which may be assembled economically and efficiently.

Another object of the present invention is to manufacture a permanent magnet rotor with a minimum of energy usage.

Also, an object of the present invention is to manufacture a permanent magnet rotor assembly having reduced quality control problems.

A further object of the present invention is to manufacture a permanent magnet rotor capable of withstanding the high stresses created by large rotational velocities without damaging the structural or magnetic integrity of the rotor.

Other objects will be apparent from the description to follow and from the appended claims.

The preceding objects are achieved according to the preferred embodiment of the invention by positioning upon a first retaining disc inner laminations, permanent magnets and pole piece laminations. A second retaining disc is placed in position so that the laminations and the magnets are located therebetween. Rivets are then inserted through holes in the retaining discs, inner laminations and pole piece laminations. A pneumatic expansion tool is placed into a hub opening centered in each retaining disc and expanded, forcing the inner laminations against the magnet, the magnets against the pole piece laminations, and the pole piece laminations against the rivets thereby tightly affixing the laminations to the magnet. The rivets are then deformed to affix the retaining discs to each other thereby securing the laminations and the magnets therebetween. Subsequently, an epoxy resin is inserted into several adhesive pockets provided in the retaining discs to further secure the laminations and the magnets within the retaining discs.

BRIEF DESCRIPTION OF THE DRAWINGS

FIG. 2 is an elevational side view of a permanent magnet rotor having a retaining disc cut away from the top half to expose the laminations and the magnets.

FIG. 3 is a sectional view of FIG. 2 taken at line 3—3.

DESCRIPTION OF THE PREFERRED EMBODIMENT

The embodiment of the invention described below is adapted for use in manufacturing a permanent magnet rotor for use in an electrical generator within a transportable refrigeration unit. It is, however, to be understood that the invention applies generally to permanent magnet rotors and likewise applies to the assembly of other components within a rotatable disc.

Figure 1:
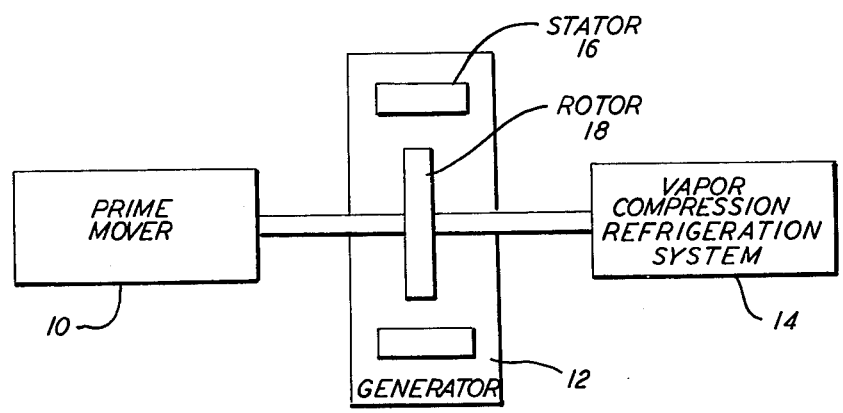
FIG. 1 is a schematic diagram of a refrigeration unit having a permanent magnet rotor.

Referring now to the drawings; FIG. 1 shows in schematic form, a transportable refrigeration unit. Prime mover 10, typically a diesel engine, is connected to generator 12 which is connected to the vapor compression refrigeration system 14. Rotor 18 of generator 12 is mounted on the shaft connecting prime mover 10 to vapor compression refrigeration system 14. Stator 16, a part of the generator, is circumferentially mounted about rotor 18 so that upon rotation of the permanent magnet rotor electrical current will be generated. The compressor speed is necessarily a function of the cooling load on the refrigeration system, consequently the permanent magnet rotor 18 rotates at a speed dependent upon the loading in the refrigeration system rather than upon the electrical load on the generator. In a typical system the prime mover is preset to operate at one of two speeds, high speed when the controls sense a large cooling need and low speed when a lesser cooling need is detected.

The permanent magnet rotor as shown in FIGS. 2 and 3 has two retaining discs 34, a series of six magnets 22, a series of six sets of inner laminations 24 made from steel, and a series of six sets of pole piece laminations 20 made from an electrical steel. Within each retaining disc is a hub opening 32 centered on the axis of the disc. Spaced about the retaining discs are rivet holes 30 through which rivets 36 are eventually placed. Also contained in the retaining discs 34 are the adhesive openings 27. Rotor blades 28 are further provided to act as an air mover for cooling the generator.

The method of assembly includes placing a first retaining disc on a template having projections extending upwardly. These projections extend through rivet holes 30 in the retaining disc. Upon these projections are mounted inner laminations 24 and pole piece laminations 20. Obviously, the inner laminations and the pole piece laminations also have openings through which the projections are inserted. A sufficient number of laminations are provided so that their overall height approximates the height of the magnets. After the laminations are in place, the six permanent magnets are then positioned between the inner laminations and the pole piece laminations.

A second retaining disc is then placed in position over the partial assembly such that the rivet holes of the second retaining disc are in registration with the rivet holes in the first retaining disc and the laminations. The partially assembled rotor is then raised vertically from the template so that rivets 36 may be inserted into rivet openings 30 as the projections of the template are withdrawn from the assembly. As the template is fully withdrawn the assembly is left with rivets extending entirely therethrough, the rivets at this point having one formed head and one blank end.

Figure 4:
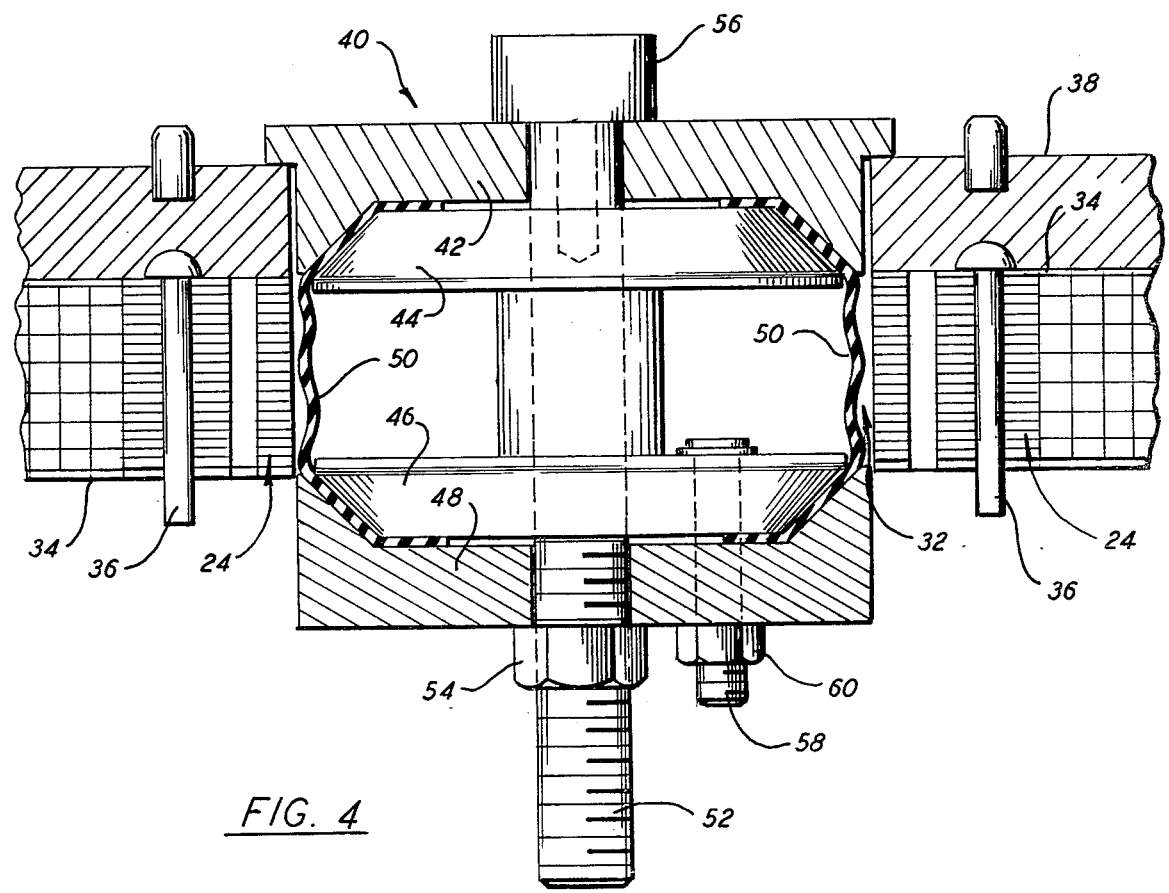
FIG. 4 is an elevational view of the pneumatic expansion cylinder assembly inserted within the hub opening of the permanent magnet rotor assembly.

The assembly is then located so that a pneumatic expansion cylinder assembly can then be positioned within the hub openings of the retaining discs. As is shown in FIG. 4, the air expansion cylinder assembly 40 is located within the hub openings 32 of the retaining discs. Also shown thereon is a riveting plate 38 placed on top of the partial assembly, said riveting plate having appropriate openings to receive the heads of the rivets 36.

The pneumatic expansion cylinder assembly consists of upper cover plate 42 and lower cover plate 48, upper sealing plate 44, lower sealing plate 46, diaphragm 50, threaded rod 52, threaded nut 54 and cover bolt 56. Upper cover plate 42 is provided with shoulders so that it rests on the surface of the riveting plate 38. The lower surface of upper cover plate 42 is designed to mate with the upper surface of upper sealing plate 44. Likewise the upper surface of lower cover plate 48 is designed to mate with the lower surface of lower sealing plate 46. Provided between the upper cover plate and the upper sealing plate and also between the lower cover plate and lower sealing plate is diaphragm 50. The entire pneumatic expansion cylinder assembly is cylindrical in configuration and diaphragm 50 forms an expandable cylindrical bellows which may be inflated to contact inner laminations 24. An air valve 58 communicates with the interior of the bellows formed by diaphragm 50 and the various plates. Air valve bolt 60 holds the air valve in place against the lower cover plate 48.

Threaded rod 52 extends through the upper cover plate, the upper sealing plate, the lower sealing plate and the lower cover plate and is threaded into upper cover plate 42 so that it is securely fastened thereto. Threaded rod nut 54 is threaded over threaded rod 52 to engage the bottom of lower cover plate 48 thereby fixing the distance between the lower cover plate and the upper cover plate. Cover bolt 56 is threaded within threaded rod 52 to further secure threaded rod 52 to upper cover plate 42.

In operation, the pneumatic expansion cylinder assembly is inserted into the hub opening between the inner laminations 24. Once in position pressurized air is supplied through the air valve 58 to the interior of the bellows formed by the diaphragm. The diaphragm then expands radially outward since the threaded rod 52 constricts expansion in any other direction; the radially outward expansion forcing the inner laminations 24 against magnets 22 and consequently magnets 22 against pole piece laminations 20. The various rivet holes provided within the interior laminations 24 are of sufficient size to allow movement of the inner laminations against the magnets 22 and to allow for continued movement of the inner laminations as magnets 22 are forced against the pole piece laminations 20 and as the pole piece laminations are forced against rivets 30 extending therethrough.

After the pneumatic expansion cylinder assembly has forced the laminations and the magnets of the appropriate position the ends of the rivets not having a preformed head are flared to firmly secure one retaining disc to the other disc and simultaneously to firmly secure the inner laminations, the pole piece laminations and the magnets between the two retaining discs. After the riveting process is completed the pneumatic expansion assembly is deflated and removed.

The next step in the assembly method is to fill adhesive pockets 26 through adhesive openings 27 with a suitable nonmetallic material (such as an epoxy resin) to fill the adhesive pockets thereby securing the permanent magnets and the pole piece laminations between the retaining discs. Furthermore, a rotor blade is inserted within each adhesive opening in the retaining disc so that it also may be simultaneously bonded to the rotor assembly by the epoxy. An epoxy resin such as Resin #5312 manufactured by the Fiber-Resin Corporation has been found highly suitable for this particular application. Typically the epoxy is delivered to the adhesive opening with an epoxy dispensing gun, such as is commercially available.

After the insertion of the epoxy into adhesive pockets 26, the assembly is allowed to stand at room temperature for approximately one hour. Thereafter the epoxy is cured by placing the assembly within a temperature programmed furnace for a specific heating cycle.

Assembly of the permanent magnet rotor is completed once the epoxy resin has cured. Nominal cleanup operations may be necessary to remove excess epoxy resin or to otherwise put the rotor into final manufacturing condition.

The invention has been described in detail with particular reference to the preferred embodiment thereof, so it will be understood that variations and modifications can be effected within the spirit and scope of the invention.

We claim:

1. A method for assembling a permanent magnet rotor which comprises the steps of:

positioning a plurality of independently movable inner laminations, a plurality of pole piece laminations and at least one permanent magnet between retaining discs;

inserting fastening means through the retaining discs;

forcing by pneumatic means the inner laminations against the magnet, the magnet against the pole piece laminations and the pole piece laminations against the fastening means; said pneumatic means applying a relatively equal pressure to each inner lamination; and securing the fastening means to fixedly maintain the inner laminations, the magnet, and the pole piece laminations between the retaining discs.

2. The method as set forth in claim 1 wherein the step of inserting fastening means comprises a plurality of rivets being inserted through the retaining discs and through the pole piece laminations and wherein the step of securing the fastening means includes forming heads on the rivets.

3. The method as set forth in claim 1 wherein the step of inserting fastening means includes rivets being inserted through the inner laminations.

4. The method as set forth in claim 1 wherein the retaining discs contain a hub opening and wherein the step of forcing by pneumatic means includes the steps of:

introducing an expansion cylinder through the hub openings; and inflating the expansion cylinder so that it expands radially outward forcing the inner laminations against the magnets, the magnets against the pole piece laminations and the pole piece laminations against the fastening means.

5. The method as set forth in claim 1 wherein the rotor has adhesive pockets formed by the retaining discs, the magnet and the pole piece laminations and further including the step of:

filling the adhesive pockets with a non-metallic material to further prevent movement of the magnet or the pole piece laminations relative to the retaining discs.

6. The method as set forth in claim 5 wherein the material is an epoxy and further including the steps of:

setting a fan blade in the epoxy; and curing the epoxy to affix the fan blade as well as the magnet and pole piece laminations to the rotor.

7. The method as set forth in claim 1 wherein the step of positioning includes positioning six sets of inner laminations, six sets of magnets and six sets of pole piece laminations, all spaced circumferentially about the retaining discs.

* * * * *